United States Patent
Anderson et al.

(10) Patent No.: US 6,736,180 B2
(45) Date of Patent: May 18, 2004

(54) METHOD AND APPARATUS FOR AUTOMATED LOCATION MARKING

(75) Inventors: Donald A. Anderson, Bellevue, WA (US); Brice A. Johnson, Federal Way, WA (US); James B. Andersen, Eatonville, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 10/012,609

(22) Filed: Oct. 30, 2001

(65) Prior Publication Data

US 2003/0079685 A1 May 1, 2003

(51) Int. Cl.[7] .................................................. B05B 1/10
(52) U.S. Cl. ........................ 156/356; 156/357; 156/384; 101/123
(58) Field of Search ................................ 156/384, 356, 156/357; 101/123; 33/19.2, 18.2, 18.3, 23.01, 23.04, 22.26

(56) References Cited

U.S. PATENT DOCUMENTS

| | | | |
|---|---|---|---|
| 2,950,535 A | * 8/1960 | Burgess | ........................ 33/26 |
| 2,984,010 A | * 5/1961 | Newcomb | ................... 33/23.04 |
| 3,872,596 A | 3/1975 | Pardubsky | .................. 33/27.11 |
| 4,786,848 A | 11/1988 | Nickerson | .................... 318/577 |
| 5,066,352 A | * 11/1991 | Albers et al. | ................ 156/265 |
| 5,775,215 A | 7/1998 | Hirate | ............................ 101/4 |
| 6,425,185 B1 | * 7/2002 | Regnault et al. | ............. 33/18.2 |

* cited by examiner

*Primary Examiner*—Richard Crispino
*Assistant Examiner*—George R. Koch, III
(74) *Attorney, Agent, or Firm*—Harness Dickey & Pierce P.L.C.

(57) ABSTRACT

A compliant marking tool for attachment to a fiber placement machine that is capable of marking detail locations on a work piece positioned on the fiber placement machine. The marking tool has a flexible member that is configured and adapted to bow and twist in response to the marking tool contacting the work piece. A holder is pivotably connected to the flexible member. A marking member is positioned in the holder and is capable of moving within the holder. The flexing of the flexible member along with the pivoting of the holder and the movement of the marking member allow the marking tool to follow the contours of the work piece and mark detail locations without damaging or at least minimizing the potential of damaging the work piece.

19 Claims, 4 Drawing Sheets

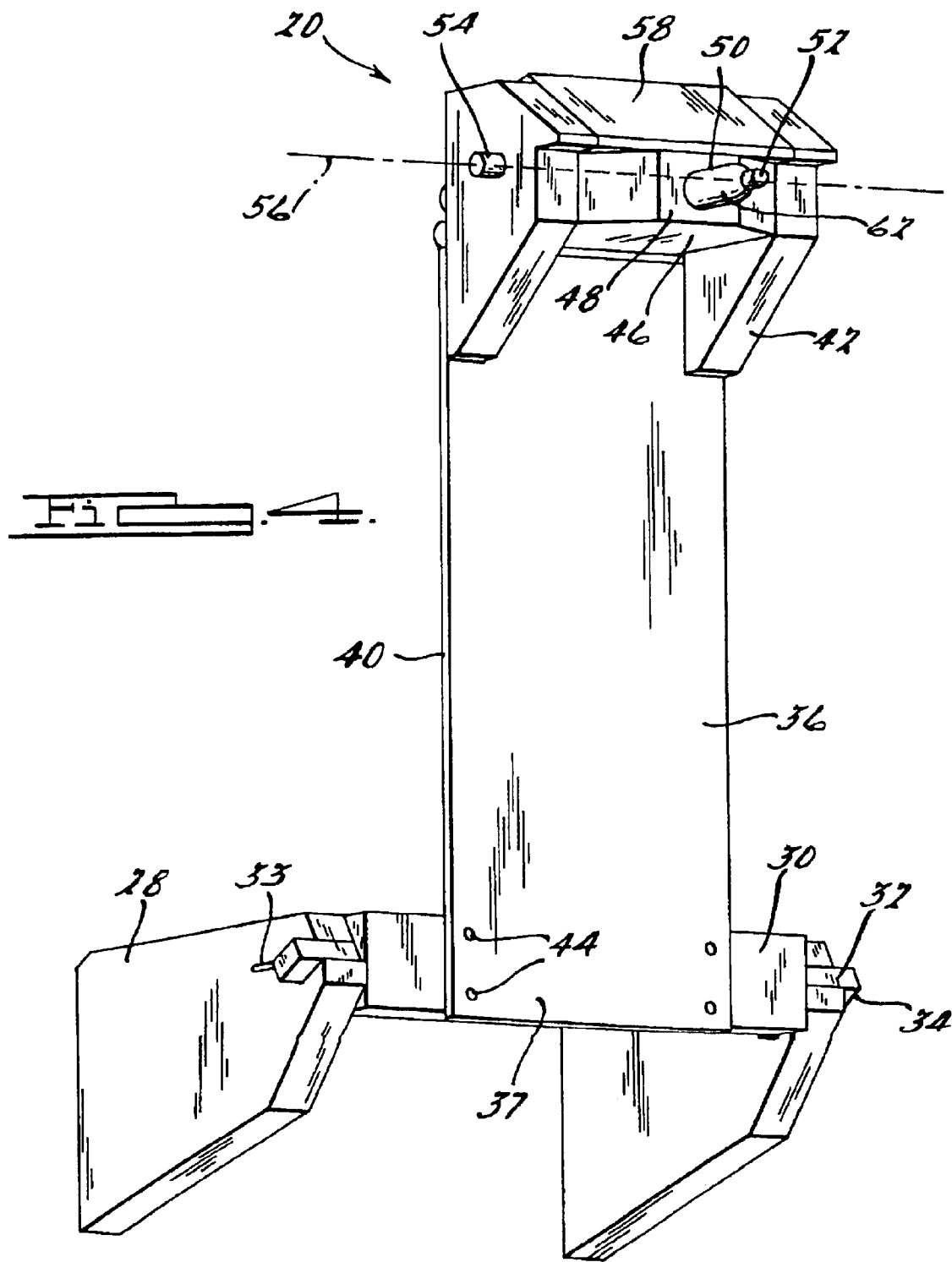

METHOD AND APPARATUS FOR AUTOMATED LOCATION MARKING

FIELD OF THE INVENTION

The present invention relates to automated marking devices and, more specifically, to an automated location marking tool for attachment to a fiber placement head on a fiber placement machine.

BACKGROUND OF THE INVENTION

A fiber placement machine (FPM) is an NC programmable and controlled machine with very high accuracy that is calibrated for each tool that is loaded. The FPM has a fiber placement head that is used to place bands of uncured epoxy impregnated composite fibers (hereinafter referred to as fibers) on a layout mandrel or tool surface mounted in the FPM. The FPM in conjunction with the fiber placement head is fully matriculating. The mandrel or tool surface can be of various shapes and sizes and, in some instances, can be a honeycomb core. The various shapes can include complex contours and features. NC programming of the FPM and positioning of the fiber placement head allows the ability to precisely locate any position on a defined mandrel/tool surface.

During the fiber placement process it is necessary to accurately locate, mark and identify areas or locations for manually (hand) placed ply details, honeycomb core locations, inspection or other details to be attached before or after the fibers have cured. The size and shape of most parts that are placed on the fibers makes it very difficult to accurately locate and mark a given location on the layout surface. Markings may also be required to be made on other materials which cover the fibers, such as film adhesives or peel plies.

Previous attempts to facilitate accurate and efficient marking of detail locations have not been successful. For example, optical laser template systems have been used to attempt to accurately locate and mark the detail locations on the fiber surface. While some success has been achieved on small, simple parts, the use of the optical laser template on large or complex parts has proved to be too cumbersome and ergonomically unfeasible. The use of the optical laser template system required an excessive amount of time and the required accuracy on a large part with multiple standard tooling guides could not be achieved. Manually marking the detail locations on the lay-up surface also proved to be not efficient and very time consuming. Additionally, the manual marking also proved to be prone to location errors.

Therefore, what is needed is an efficient way to accurately apply marks on the fiber surface regardless of the size or complexity of the detail locations. Because the FPM has the ability to accurately and efficiently locate any point on the fiber surface, it is desirable to utilize the FPM to make the marks on the fiber surface. Therefore, a marking tool for attachment to the FPM that can be used to mark the detail locations is needed.

Furthermore, the fiber surface and underlying structure, such as a honeycomb core, are fragile and can be easily damaged during the detail location marking procedure. Because the fiber surface and underlying structure are fragile, the marking tool designed to be used with the FPM must be capable of doing so without damaging the fiber surface and the underlying structure. For example, in a typical application the fibers are applied to a honeycomb core and the marking tool is then used to apply detail locations on the fibers or other materials that are on top of the honeycomb core. Because the fibers are not cured if too much pressure is applied by the marking tool on the fibers, the marking tool can penetrate the fibers and catch an edge of a honeycomb core cell and potentially cause significant damage or tearing of the cell. Therefore, what is needed is a marking tool that can be used on the FPM that reduces and/or eliminates the possibility of damage being caused to the fibers and the underlying structure.

Some FPMs are equipped with a laser that is programmed to show the location of details on the surface of the fibers. However, the laser, while being capable of pin pointing discrete points of the details on the fiber surface, does not leave any type of mark that can later be used to attach the details to the fiber surface. Therefore, the laser is presently used to inspect the location and accuracy of previously marked details on the fiber surface. That is, after the details have been marked on the fiber surface the NC program that controls the movement of the laser is run and the laser will trace the outline of the detail locations by moving from discrete point to discrete point along the details and a person can visually observe the laser beam as it moves along the detail location to determine if the detail markings are aligned with the laser beam striking the fiber surface.

The use of a FPM with a laser can aid in the use of the FPM to make marks of detail locations on the fiber surface. Because FPMs with a laser have an NC program that controls the laser's position so that the laser can illuminate the location of the details, the NC program, with some modification, might be capable of being utilized to operate the marking tool attached to the FPM. Therefore, it is desirable to have a marking tool that can be attached to the FPM and utilize the existing NC program (with some modifications) written for the laser to control the operation of the marking tool.

SUMMARY OF THE INVENTION

The present invention is directed to a method and apparatus for using an NC controlled FPM to apply detail markings on a work piece in the FPM, in accordance with preferred embodiments of the present invention. In one preferred embodiment, a compliant marking tool is attached to a FPM. The marking tool makes marks on the work piece without damaging the work piece. The marking tool has a flexible member that is configured and adapted to flex in response to the contact between the marking tool and the work piece as the marking tool makes marks on the work piece. The flexing of the flexible member allows the marking tool to follow the contour of the work piece. The marking tool has a holder that is pivotally connected to the flexible member. The pivotable connection allows the holder to pivot relative to the flexible member. A marking member is positioned in the holder. The marking member has a tip that is capable of making marks on the work piece when the tip contacts the work piece. the marking member is positioned in the holder so that the tip can contact the work piece when the FPM is being used to operate the marking tool.

Preferably, the tip extends longitudinally from the marking member and the marking member can move longitudinally relative to the holder in response to the tip contacting the work piece. Even more preferably, the marking member is biased to resist longitudinal movement in response to the tip contacting the work piece. Additionally, it is preferred that the tip be offset from an axis of rotation of the pivot connection between the holder and the flexible member. Furthermore, it is preferred that the pivot connection between the flexible member and the holder be biased toward a predetermined orientation. The marking tool may also have a stop that limits the pivoting of the holder relative to the flexible member.

The flexible member can also be configured and adapted to allow the tip to vibrate as the tip travels along the surface of the work piece. The vibrating of the tip facilitates a flow of marking material to the tip.

The marking tool is preferably attached to the FPM in the location where the compaction roller is normally attached to the FPM. When the marking tool is attached to the FPM, the marking tool is attached so that the tip is in a known position relative to the FPM axis so that the marking tool can be controlled by an NC program that operates the FPM.

The marking tool can also be attached so that the tip is offset a known distance from the compaction roller. When the tip is offset a known distance from the compaction roller, the NC program that controls the compaction roller can be used to control the movement of the tip by programming an offset from the compaction roller into the NC program. The use of the NC program written for the compaction roller avoids the necessity of writing a new NC program for the marking tool.

If the FPM has a laser attached to the FPM, it is preferred that the marking tool be mounted on the FPM so that a center line of the tip is in-line with the laser beam being emitted by the laser and the tip is offset a known distance from the laser so that the NC program that controls the laser can be used to control the movement of the tip by programming the offset from the laser. Because the laser is at a known position relative to the FPM, the positioning of the tip of the marking tool at a known distance from the laser causes the tip to be at a known position relative to the FPM. This enables the existing NC program that was written to operate the laser to be used to operate the marking tool. The use of the NC program written for the laser avoids the necessity of writing a new NC program for the marking tool.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a perspective view of a marking tool of the present invention; and

FIG. 5 is a partial cross sectional view of the invention of FIG. 3.

DETAILED DESCRIPTION OF THE PREFERRED EMBODIMENTS

The following description of the preferred embodiment(s) is merely exemplary in nature and is in no way intended to limit the invention, its application, or uses.

Figure 1:
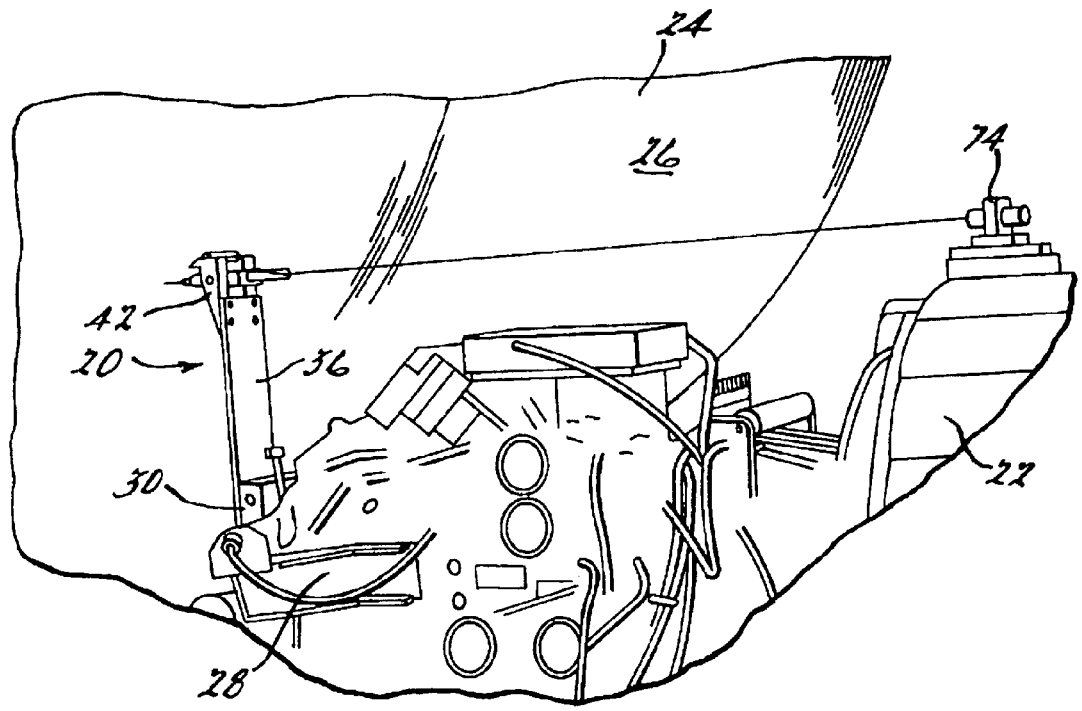
FIG. 1 is a general drawing of the marking tool attached to a fiber placement machine which is being used to make marks on a work piece.

Referring to FIG. 1, there is shown a marking tool, generally indicated as 20, attached to a fiber placement machine (FPM) 22 in accordance with a preferred embodiment of the present invention for automated location marking on a work piece 24 positioned on the FPM 22. The work piece 24 has a surface 26 on which the marking tool 20 makes marks. The FPM 22 is an NC machine that has a fiber placement head 28 that is attached to the FPM 22 and performs the actual fiber placement on the work piece 24. The fiber placement head 28 has a compaction roller (not shown) that compacts the fibers being placed on the work piece 24 by the FPM 22.

When attaching the marking tool 20 to the FPM 22, the marking tool 20 is attached so that the marking tool 20 and the various components that comprise the marking tool 20 are in a known position relative to a machine axis (not shown) of the FPM 22. The attaching of the marking tool 20 and the various components that comprise the marking tool 20 in a known position relative to the machine axis allows the FPM 22 to control the marking tool 20 with an NC program. Preferably, the marking tool 20 is attached to the FPM 22 in place of the compaction roller on the fiber placement head 28. That is, when it is desired to mark locations on the work piece 24 with the marking tool 20 the compaction roller is removed from the fiber placement head 28 and the marking tool 20 is attached to the fiber placement head 28 where the compaction roller was previously attached.

Figure 2:
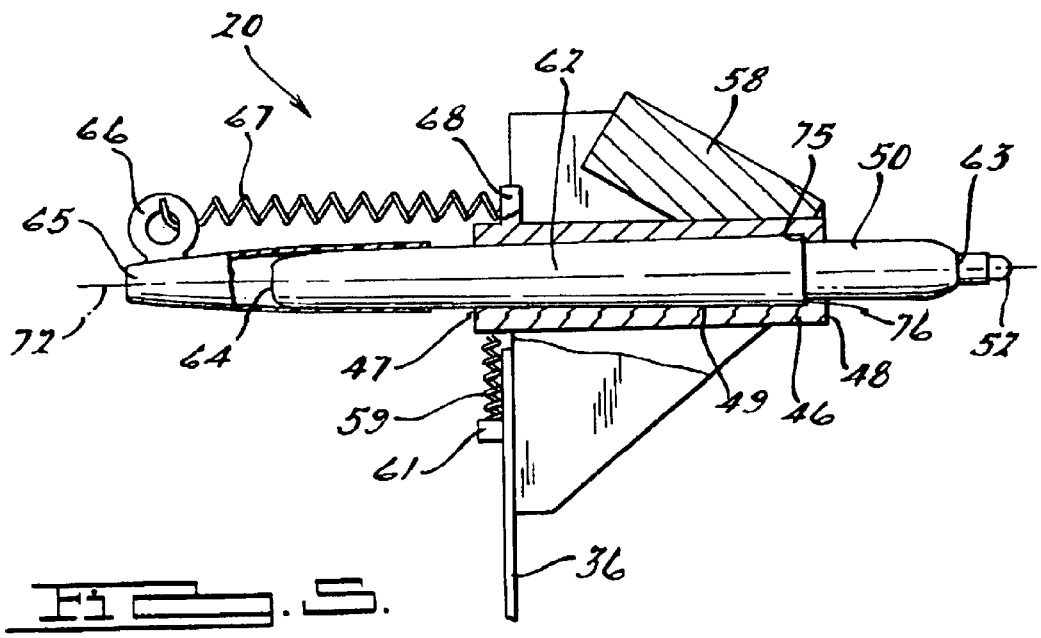
FIG. 2 is a perspective view of the marking tool of FIG. 1.
Figure 2:
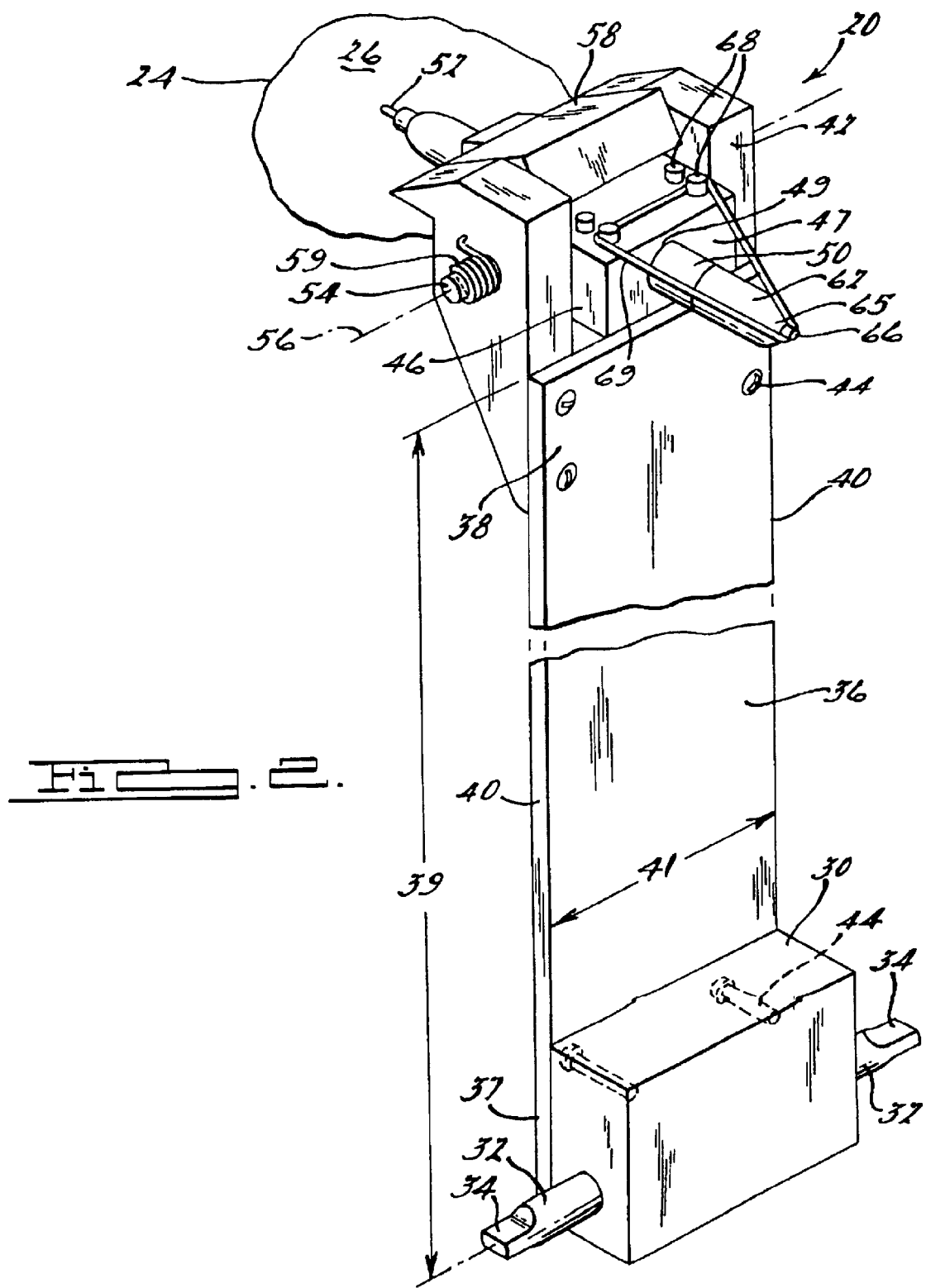
Figure 3:
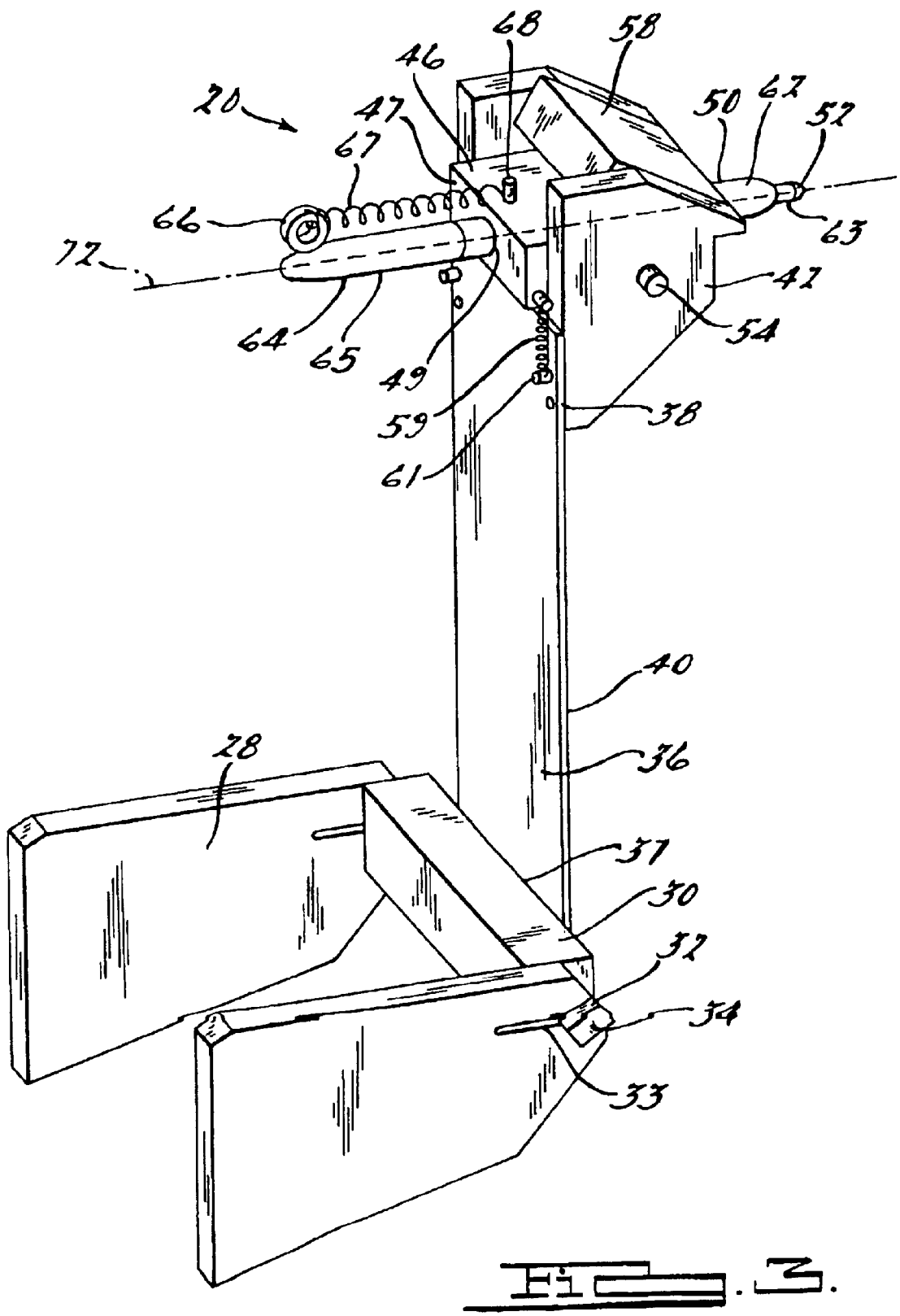
FIG. 3 is a perspective view of a marking tool of the present invention.

To facilitate the attachment of the marking tool 20 to the FPM 22 the marking tool 20, as can be seen in FIG. 2, has a mounting block 30 that is configured and adapted to attach to the fiber placement head 28 at the location where the compaction roller is normally attached. The mounting block 30 has a shaft 32 extending from each end of the mounting block 30. The shaft 32 has ends 34 that are generally rectangular in shape so that they can fit in slots 33, as shown in FIGS. 3 and 4. The slots 33 are part of the fiber placement head 28 and are used by the compaction roller and the marking tool 20 to attach to the fiber placement head 28. The slots 33 allow for adjustment in the attachment of the marking tool 20 to the FPM 22. While the marking tool 20 is shown and described as being attached to the fiber placement head 28 at the location where the compaction roller is normally attached, it should be understood that the marking tool 20 can be attached to the FPM 22 in a variety of locations and still be within the scope of the invention as defined by the claims.

The marking tool 20 is generally comprised of a flexible member 36, which is preferably in the shape of a beam, and has opposite first and second ends 37, 38 and a length 39 therebetween. The flexible member 36 also has laterally opposite side walls 40 that extend along the length 39 from the first end 37 to the second end 38. The laterally opposite side walls 40 define a lateral width 41 of the flexible member 36. The first end 37 of the flexible member 36 is attached to the mounting block 30. The second end 38 of the flexible member 36 is attached to a bracket 42. The first and second ends 37, 38 of the flexible member 36 are attached to the mounting block 30 and bracket 42, respectively, by bolts 44. However, it should be understood that other means of fastening the flexible member 36 to the mounting block 30 and the bracket 42, as are known in the art, can be utilized. A holder 46 is pivotably attached to the bracket 42. The holder 46 has longitudinally opposite back and front ends 47, 48. The holder 46 also has an opening 49 through which a marking member 50 can be inserted. Preferably, the opening 49 extends longitudinally through the holder 46 from the front end 48 to the back end 47. The marking member 50 has a tip 52 that is used to make marks on the surface 26 of the work piece 24. When the marking member 50 is positioned in the opening 49 the tip 52 of the marking member 50 extends longitudinally outward from the front end 48 of the holder 46 so that the FPM 22 can use the marking tool 20 to make marks on the surface 26 of the work piece 24. The various components of the marking tool 20 will be described in more detail below.

Preferably, the flexible member 36 is in the shape of a beam with a rectangular cross sectional area. The flexible member 36 is dimensioned so that the flexible member 36 can bow and/or twist in response to a force being transmitted from the marking member 50 to the marking tool 20. The force is caused by the tip 52 of the marking member 50 making marks along and following contours of the surface 26 of the work piece 24. The bowing and/or twisting of the flexible member 36 (in conjunction with other features of the marking tool 20 that will be discussed in detail below) allows the tip 52 of the marking member 50 to follow the contours of and make marks on the surface 26 of the work piece 24 without causing damage to or at least minimizing the possibility of damaging the work piece 24.

Preferably, the flexible member 36 is designed to allow vibration to occur in the marking tool 20 in response to the tip 52 of the marking member 50 travelling along the surface 26 of the work piece 24. Typically, the surface 26 of the work piece 24 is undulating and, as such, can induce vibrations in the marking tool 20. The flexible member 36 is designed to allow the marking member 50 to vibrate in response to the tip 52 travelling over the surface 26 of the work piece 24 so that marking material (not shown) within the marking member 50 is agitated and the flow of the marking material to the tip 52 is facilitated.

Preferably, the flexible member 36 is made from fiberglass. However, it should be understood that a variety of materials can be utilized to construct the flexible member 36 with sufficient properties, as discussed above and below, so as to allow the marking tool 20 to make marks on the work piece 24 without damaging or at least minimizing the potential to damage the work piece 24 and without departing from the scope of the invention. Furthermore, while the flexible member 36 has been discussed as preferably being a beam with a rectangular cross section, it should be understood that the flexible member 36 could take a variety of shapes and forms and still be within the scope of the invention. For example, the flexible member 36 could be in the form of two parallel cylindrical rods that are spaced apart and capable of bowing and/or twisting in response to a force being transmitted from the marking member 50 to the marking tool 20 and still be within the scope of the invention.

Preferably, as can be seen in FIGS. 2–4, the holder 46 is pivotably mounted to the bracket 42 by a pin 54. The pin 54 extends into the holder 46 and allows the holder 46 to rotate along a single axis of rotation 56 which is the same as the centerline of the pin 54. Preferably, the pin 54 extends laterally into the holder 46 and the axis of rotation 56 is a lateral axis of rotation which is generally parallel to the lateral width 41 of the flexible member 36 and generally perpendicular to the length 39 of the flexible member 36 when the marking tool 20 is not in contact with the work piece 24. Even more preferably, a stop 58, as can best be seen in FIG. 4, is located on the bracket 42 and limits the rotational movement of the holder 46 about the axis of rotation 56.

Preferably, the holder 46 is biased so that the holder 46 rotates to be in contact with the stop 58 when no force is being applied to the tip 52 of the marking member 50. The biasing of the holder 46 to be positioned against the stop 58 can be accomplished by a variety of means. For example, an elastomeric material, such as a band of rubber, or a spring can be used to bias the rotation of the holder 46. Preferably, a spring 59 is used to bias the rotational movement of the holder 46. The spring 59, as shown in FIG. 2, can be attached to the pin 54 to bias the rotation of the holder 46. Alternatively, the spring 59, as shown in FIG. 3, can be attached to posts 60 on the holder 46 and to posts 61 on the flexible member 36 to bias the rotation of the holder 46. The rotational biasing force can be adjusted by using a springs 59 with differing spring rates or by differing the elongation of the spring 59 necessary to attach the spring 59 to the posts 60, 61. While the biasing of the rotation of the holder 46 has been described as being performed by a spring 59 and/or elastomeric material, it should be understood that other methods of biasing the rotation of the holder 46 can be employed without departing from the scope of the invention. Furthermore, the spring 59 can be attached to the holder 46 and the flexible member 36 by other methods, known in the art, and still be within the scope of the invention.

Preferably, the marking member 50 is one of a variety of commercially available pens 62. For example, a SHARPIE brand permanent ink marker has been found to work well when making marks on the work piece 24. Also, an opaque oil based pen such as those sold under the UNI-PAINT brand have proven to work well. These commercially available pens 62 generally have longitudinally opposite first and second ends 63, 64 with a longitudinal length therebetween. A tip 52 extends longitudinally from the first end 63. The pens 62 contain marking material (not shown), such as ink or oil based opaque paint, which is applied to the surface 26 of the work piece 24 by the tip 52.

Preferably, the opening 49 in the holder 46 is dimensioned to allow the marking member 50 to be inserted tip 52 first through the back end 47 of the opening 49 so that the tip 52 of the marking member 50 extends longitudinally outward from the front end 48 of the holder opening 49. The pens 62 used as marking members 50 do not have standardized dimensions. Therefore, the opening 49 in the holder 46 is dimensioned for the specific pen 62 that is to be used. All of the pens 62 have a shoulder 75 that encircles the pens 62. Preferably, as can be seen in FIG. 5, the opening 49 in the holder 46 has a projection 76 that extends into the opening 49 so that when the pen 62 is inserted into the opening 49 the shoulder 75 of the pen 62 catches on the projection 76 and cannot pass completely through the opening 49. The projection 76 thereby limits the insertion of the pen 62 through the opening 49.

Preferably, the opening 49 in the holder 46 is dimensioned so that the pen 62 can move longitudinally within the opening 49 in response to a force being applied to the tip 52 as it travels along the surface of the work piece 24. Even more preferably, the pen 62 is biased to resist longitudinal movement of the pen 62 in response to a force being applied to the pen 62 as the tip 52 travels along the surface 26 of the work piece 24. It is preferred that the pen 62 be biased toward the work piece 24 with the shoulder 75 of the pen 62 in contact with the projection 76 in the holder opening 49. To facilitate the biasing of the pen 62, a cap 65 is positioned over the second end 64 of the pen 62. The cap 65 has a projection 66 that is used to bias the pen 62.

The biasing of the longitudinal movement of the pen 62 can be accomplished by a variety of means. For example, as shown in FIG. 3, a spring 67 can be used to bias the pen 62. The spring 67 is attached to the projection 66 on the cap 65 and to a post 68 on the holder 46. The spring 67 biases the longitudinal movement of the pen 62 so that the shoulder 75 on the pen 62 is in contact with the projection 76 in the opening 49. As shown in FIG. 2, an elastomeric material can also be used to bias the pen 62. An elastomeric band 69 is attached to one or more posts 68 on the holder 46 and to the projection 66 on the cap 65. The elastomeric band 69 biases the pen 62 to move longitudinally toward the front end 48 of the holder 46 and against the projection 76 within the holder opening 49. The spring 67 and the elastomeric band 69 thereby cause the pen 62 to resist longitudinal movement caused by a force being applied to the tip 52 of the pen 62 as the tip 52 travels along the surface 26 of the work piece 24.

The amount of force exerted by the spring 67 and the elastomeric band 69 on the marking member 50 are, respectively, a function of the spring rate of the spring 67 and the material out of which the elastomeric band 69 is made. The amount of force is also influenced by the amount of elongation required to connect the spring 67 or elastomeric band 69 between the holder 46 and the marking member 50 when the marking member 50 is being held against the projection 76 in the holder opening 49. Therefore, different spring rates and lengths for the spring 67 can be used to obtain different levels of biasing when using a spring 67 and different sizes or material of construction can be used for the elastomeric band 69 to obtain different levels of biasing when using an elastomeric band 69. Additionally and/or alternatively, the holder 46 can be provided with a plurality of posts 68, such as those shown in FIG. 2, that allow the spring 67 or the elastomeric band 69 to be elongated to various lengths to alter the force of the longitudinal biasing of the marking member 50.

While the spring 67 and the elastomeric band 69 have been discussed and shown as connecting to posts 68 on the holder 46, it should be understood that other methods, as are known in the art, of fastening the spring 67 and the elastomeric band 69 to the holder 46 and/or the marking member 50 can be employed without departing from the scope of the invention. It should further be understood that other methods of longitudinally biasing the marking member 50, as are known in the art, can also be employed without departing from the scope of the invention.

Preferably, the opening 49 in the holder 46 has a longitudinal centerline 72 which is perpendicular to the axis of rotation 56 about which the holder 46 rotates. The centerline 72 of the holder opening 49 may intersect the axis of rotation 56 about which the holder 46 rotates. However, as shown in FIG. 4, it is preferred that the centerline 72 of the holder opening 49 is offset from the axis of rotation 56 toward the first end 37 of the flexible member 36 in order to facilitate marking on the surface 26 of the work piece 24 without damaging or at least minimizing the potential of damaging the work piece 24, as will be described in detail below.

The marking tool 20 is designed to not damage or at least minimize the potential to damage the work piece 24 when marking marks on the work piece 24. The work piece 24 can take a variety of forms and be made from a variety of materials, all of which may be capable of withstanding varying amounts of force between the tip 52 of the marking member 50 and the surface 26 of the work piece 24 without sustaining damage. Additionally, the work piece 24 can have an underlying structure that is fragile. For example, some work pieces 24 will have an underlying structure that is a honeycomb core with film material on the surface of the honeycomb core. When the work piece 24 has a honeycomb core over which fibers are being placed, the tip 52 of the marking member 50 when making marks can catch on an edge of a cell of the honeycomb core and deform or destroy the cell. The force required to damage the honeycomb core can be as little as one pound of force. Therefore, the marking tool 20 is designed to exert less than the force required to damage the work piece 24 when applying marks to the work piece 24.

To accomplish the marking of the work piece 24 without damaging or at least minimizing the potential to damage the work piece 24, the flexible member 36 bows and twists, the marking member 50 moves longitudinally, and the holder 46 pivots in response to the force being applied to the tip 52 of the marking member 50 as the tip 52 travels along the surface 26 of the work piece 24. The force at which damage will be caused to the work piece 24 will vary depending on the type of work piece 24 in the FPM 22. Therefore, the marking tool 20 is designed so that the tip 52 of the marking member 50 does not apply (or at least minimizes the possibility of applying) any force on the work piece 24 greater than the force that will cause damage to the work piece 24. Hence, the marking tool 20 can have its various components adjusted to compensate for differing needs of the various work pieces 24 that are placed in the FPM 22. For example, the force at which the flexible member 36 bows and twists can be varied by adjusting the material of which it is made or the dimensions, the amount of longitudinal bias of the marking member 50 can be adjusted as described above, the offset between the centerline 72 of the opening 49 can be varied, and the biasing of the rotational movement of the holder 46 can be adjusted as discussed above. The operation of the various components as the marking tool 20 is used to make marks on the work piece 24 will be described in more detail below.

The marking tool 20 is mounted to the FPM 22 so that the tip 52 of the marking member 50 is at a known position relative to the FPM 22. The mounting of the tip 52 at a known position relative to the FPM 22 allows the use of existing NC programming written to control the operation of the FPM 22 to control the marking tool 20. For example, when the marking tool 20 is attached to the fiber placement head 28 at the location where the compaction roller is normally attached and the tip 52 is at a known position relative to the normal location of the compaction roller, the NC program that controls the operation of the compaction roller can be used (with modification) to control the marking tool 20. The NC program used to control the compaction roller is modified by entering the boundaries of the detail locations to be marked and the known position of the tip 52 so that the modified NC program causes the marking tool 20 to mark the detail locations on the surface 26 of the work piece 24 instead of controlling the compaction roller.

Some FPMs 22 have a laser 74 that is mounted on the FPM 22. The laser 74 is typically hard mounted to the FPM 22 so that the position of the laser 74 relative to the FPM 22 does not change. The laser 74 is typically used to illuminate the location of details which are to be applied to the work piece 24. The movement of the laser 74 is controlled by the FPM 22, via an NC program, to have the laser 74 trace the outline of details that are to be applied to the surface 26 of the work piece 24.

The present invention can utilize the presence of a laser 74 on the FPM 22 to make operation of the marking tool 20 with the FPM 22 easier. To do this, the marking tool 20 is attached to the FPM 22 as was described above. The marking tool 20 is dimensioned so that when the marking tool 20 is attached to the FPM 22, the centerline 72 of the holder opening 49 is in-line with the laser 74. In this manner, a marking member 50 whose tip 52 is aligned with the centerline 72 of the holder 46 will also be in-line with the laser 74. However, as can be seen in FIG. 1, the tip 52 of the marking member 50 will be closer to the surface 26 of work piece 24 then the laser 74. Therefore, it is preferred that the marking tool 20 be attached to the FPM 22 so that not only is the tip 52 of the marking member 50 aligned with the laser 74 but also so that the tip 52 of the marking member 50 is at a known offset from the laser 74 toward the work piece 24. By having the tip 52 of the marking member 50 aligned with the laser 74 and positioned a known offset from the laser 74, the tip 52 of the marking member 50 is at a known position relative to the FPM 22 and the NC program written for the laser 74 can (with some modification) be used to operate the marking tool 20 attached to the FPM 22. The NC program written for the laser 74 is modified by reprogramming or changing the offset between the laser 74 and the surface 26 of the work piece 24 so that the tip 52 will contact the surface 26 when the NC program is run. The NC program will now cause the tip 52 of the marking tool 20 to contact the surface 26 of the work piece 24 and mark the locations of the details on the work piece 24 instead of causing the laser 74 to illuminate and trace the locations of the details. Therefore, when a FPM 22 has a laser 74, the NC programming of the FPM 22 can be accomplished by modifying the existing NC program that was written to control the laser 74.

While the marking tool 20 has been described as being controlled by modifying the NC program written for the compaction roller and by modifying the NC program written for laser 74, it should be understood that a new NC program can be created to control the marking tool 20 attached to the FPM 22 without departing from the scope of the invention. It should also be understood that the marking tool 20 attached to the FPM 22 can also be manually controlled by manually operating the FPM 22, as is know in the art, without departing from the scope of the invention. Therefore, while it is preferred to use the modified NC program written for the laser 74, it is not necessary to use the NC program written for the laser 74 nor is it necessary for the FPM 22 to have a laser 74 for the FPM 22 to be capable of using the marking tool 20.

In operation, the FPM 22 is preferably provided with an NC program that is programmed to control the movement of the marking tool 20 on the FPM 22. The NC program can be a modified version of the NC program developed for using the compaction roller, the laser 74, or any other tool attached to the FPM 22, as was described above, or can be a new NC program written specifically for the marking tool 20. Preferably, the marking tool 20 is attached to the fiber placement head 28 of the FPM 22 at the location where the compaction roller is normally mounted. If the FPM 22 has a laser 74 and the NC program being used is a modified version of the NC program written for the laser 74 then the marking tool 20 is attached so that the centerline 72 of the holder opening 49 and the tip 52 of the marking member 50 are aligned with the laser 74 and the tip 52 of the marking member 50 is offset a known distance from the laser 74. Prior to inserting the marking member 50 in the holder 46 the laser 74 is turned on so that the alignment between the centerline 72 of the holder opening 49 can be verified by observing a laser beam emitted from the laser 74 passing through the center of the holder opening 49. After the alignment has been verified, the marking member 50 can be inserted into the holder opening 49, as discussed below. If the opening 49 is not aligned with the laser 74, the attachment between the marking tool 20 and the fiber placement head 28 is adjusted by moving the ends 34 within the slots 33 on the fiber placement head 28 until the proper alignment is achieved.

A marking member 50 is inserted into the holder 46 by inserting the tip 52 through the holder opening 49 from the back end 47 of the holder 46 until the marking member 50 contacts the projection 76 within the holder opening 49. The cap 65 is positioned on the marking member 50. The spring 67 or elastomeric band 69 is attached to the post(s) 68 and stretched so that the spring 67 or elastomeric band 69 can be attached to the projection 66 on the cap 65. After the spring 67 or elastomeric band 69 is attached to the holder 46 and the marking member 50, the ability of the marking member 50 to move longitudinally is checked by either pulling on the marking member 50 or pushing on the tip 52. The bias of the rotational movement of the holder 46 can also be observed by manually rotating the holder 46. The FPM machine 22 can then be operated by running the NC program.

The FPM 22 is a fully matriculating NC controlled machine. During operation, the work piece 24 may be rotated toward or away from the tip 52 of the marking member 50. The marking tool 20 may also be moved in multiple directions relative to the work piece 24 during the operation of the FPM 22. Therefore, the tip 52 of the marking member 50 is capable of moving along the surface 26 of the work piece 24 in any direction. Additionally, the surface 26 of the work piece 24 may have complex and detailed contours over which the tip 52 of the marking member 50 will need to travel and make marks.

When the tip 52 is marking marks on the surface 26 of the work piece 24 and the work piece 24 is rotating away from (upward in FIG. 1) the marking tool 20, the pull of the surface 26 on the tip 52 causes the marking member 50 to want to rotate upward along with the work piece 24. This upward pull causes the holder 46 to rotate upwards until the holder 46 hits the stop 58 (unless the holder 46 is already against the stop 58 due to the biasing of the rotation of the holder 46 by the spring 59). The upward pull also causes the flexible member 36 to flex and the second end 38 of the flexible member 36 to bow away from the work piece 24 so that the tip 52 travels along the contours of the surface 26 of the work piece 24 and makes a mark. The marking member 50 can also move longitudinally within the holder opening 49 to allow the tip 52 to follow the contours of the surface 26 of the work piece 24. The flexing and bowing along with the longitudinal movement of the marking member 50 allows the tip 52 to travel over various contours on the surface 26 of the work piece 24 without damaging or at least minimizing the possibility of damaging the work piece 24.

When the work piece 24 is rotating toward (downward in FIG. 1) the marking tool 20, the tip 52 is pushed downward by the tip 52 traveling along the surface 26 of the work piece 24. The downward push causes the holder 46 to rotate downward. If the force of the downward push is sufficient, the holder 46 will overcome the biasing of the spring 59 and rotate downward also. Additionally, the flexible member 36 may also bow with the second end 38 of the flexible member 36 moving toward the work piece 24 so that the tip 52 can flex downwardly in response to the rotation of the work piece 24 and continue to make marks on the surface 26. The marking member 50 can also move longitudinally within the holder opening 49 to allow the tip 52 to follow the contours of the surface 26 of the work piece 24. The rotation of the holder 46, the longitudinal movement of the marking member 50, and the bowing of the flexible member 36 allows the tip 52 to travel along the surface 26 without getting hooked or snared on the surface 26 and prevents or at least minimizes the possibility of damage to the work piece 24.

When the marking tool 20 moves along a length of the work piece 24, the tip 52 experiences a lateral force which causes the flexible member 36 to twist in response to the lateral force on the tip 52. The twisting of the flexible member 36 allows the tip 52 to travel over the surface 26 of the work piece 24 without damaging or at least minimizing the possibility of damaging the work piece 24.

Typical detail locations to be marked on the surface 26 of the work piece 24 require other than straight marks up and down on the work piece 24 or along the length of the work piece 24. Therefore, all of the components of the marking tool 20 will usually be active in response to the tip 52 traveling along the surface 26 of the work piece 24. That is, the flexible member 36 will both bow and twist, the holder 46 will rotate about the axis of rotation 56, and the marking member 50 will move longitudinally within the holder opening 49 in response to the forces being applied to the marking tool 20 as the tip 52 travels along the surface 26 of the work piece 24. In this manner, the twisting and bowing of the flexible member 36, the biased rotation of the holder 46 about the axis of rotation 56, and the biased longitudinal movement of the marking member 50 within the holder opening 49 allow the tip 52 of the marking member 50 to travel along the various contours of the surface 26 of the work piece 24 without damaging or at least minimizing the potential of damaging the work piece 24.

As can be seen in FIG. 1, when the FPM 22 has a laser 74 and it is desired to use the NC program written for the laser 74, the marking tool 20 is first attached to the head 28 of the FPM 22 so that the centerline 72 of the holder opening 49 is aligned with the laser 74 and the tip 52 of the marking member 50 is a known offset from the location of the laser 74. The laser is turned on so that the user of the FPM 22 can visually observe whether the centerline 72 of the holder opening 49 is aligned with the laser 74. If the centerline 72 is not aligned with the laser 74, then the marking tool 20 is adjusted as discussed above. The next step is to modify the NC program written for the laser by providing the program with a new offset that will allow the tip 52 of the marking member 50 to contact the surface 26 of the work piece 24 when the NC program is being run. The NC program and the FPM 22 are then run until the tip 52 of the marking member 50 is positioned at the location where the first detail is to be marked on the surface 26 of the work piece 24. It is then verified that the tip 52 is actually in contact with the surface 26 of the work piece 24. If the tip 52 of the marking member 50 is not contacting the surface 26 of the work piece 24 then the NC program is modified by providing the program with a new offset. The NC program and the FPM 22 are then run again to verify if the new offset allows the tip 52 to contact the surface 26 of the work piece 24. This process continues until contact between the tip 52 and the surface 26 of the work piece 24 occurs. When the tip 52 is contacting the surface 26 of work piece 24 at the location where the first detail is to be marked on the work piece 24 the modified offset put into the NC program is correct. The NC program and the FPM 22 are then run and the detail locations are marked on the surface 26 of the work piece 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compliant marking tool for attachment to a fiber placement machine, the marking tool making marks on a work piece in the fiber placement machine, the marking tool comprising:

a flexible member configured and adapted to flex in response to the marking tool contacting the work piece and to allow the marking tool to follow a contour of the work piece;

a holder pivotably connected to the flexible member so that the holder can pivot relative to the flexible member; and a marking member having a tip, the marking member being attached to the holder so that the tip can contact the work piece, the tip making a mark on the work piece when the tip contacts the work piece.

2. The marking tool of claim 1, wherein:

the marking member has a longitudinal length with the tip extending longitudinally from the marking member and the marking member can move longitudinally relative to the holder in response to the tip contacting the work piece.

3. The marking tool of claim 2, wherein:

the marking member is biased to resist longitudinal movement in response to the tip contacting the work piece.

4. The marking tool of claim 3, wherein:

an elastomeric band biases the marking member to resist longitudinal movement in response to the tip contacting the work piece.

5. The marking tool of claim 3, wherein:

a spring biases the marking member to resist longitudinal movement in response to the tip contacting the work piece.

6. The marking tool of claim 1, wherein:

the tip is offset from an axis of rotation of the pivot connection between the holder and the flexible member.

7. The marking tool of claim 1, wherein:

the pivot connection between the flexible member and the holder is biased toward a predetermined orientation.

8. The marking tool of claim 1, further comprising:

a stop, the stop limiting a rotation of the pivot connection.

9. The marking tool of claim 1, wherein:

the flexible member allows the tip to vibrate as the tip travels along a surface of the work piece to facilitate a flow of marking material in the tip.

10. The marking tool of claim 1, wherein:

the marking tool is adapted and configured to be mounted in a compaction roller position on a head of the fiber placement machine.

11. The marking tool of claim 1, wherein:

the marking tool is mounted on the fiber placement machine with the tip being at a known position relative to the fiber placement machine so that the marking tool can be controlled by an NC program that controls the fiber placement machine.

12. The marking tool of claim 11, wherein:

a centerline of the tip is in-line with a laser attached to the fiber placement machine;

the tip is offset a known distance from the laser; and control of the marking tool is programmed into the fiber placement machine using an NC program written to control the laser that is modified to account for the known offset between the tip and the laser.

13. A compliant marking tool for attachment to a fiber placement machine, the marking tool making marks on a work piece, the marking tool comprising:

a mount for mounting the marking tool to the fiber placement machine, the mount being dimensioned to be attached to a head on the fiber placement machine;

a flexible member having opposite first and second ends and a length therebetween with the flexible member first end being attached to the mount, the flexible member flexing in response to contact between the work piece and the marking tool and the flexing of the flexible member allowing the marking tool to maintain contact with the work piece and follow contours of the work piece;

a holder pivotably connected to the second end of the flexible member, the pivot connection allowing the holder to pivot about a single axis of rotation which is generally perpendicular to the length of the flexible member when the marking tool is not in contact with the work piece; and a marking member having opposite first and second ends and a longitudinal length therebetween, the marking member having a tip extending longitudinally from the marking member first end, the marking member being attached to the holder so that the tip extends longitudinally outward from the holder and the tip can contact the work piece, the tip making a mark on the work piece when the tip and the work piece come in contact.

14. The marking tool of claim 13, wherein:

the attachment of the marking member to the holder allows the marking member to move longitudinally within the holder in response to the tip contacting the work piece and the marking member is biased to resist the longitudinal movement.

15. The marking tool of claim 13, wherein:

the longitudinal length of the marking member is offset from and generally perpendicular to the axis of rotation of the holder and the longitudinal length of the marking member is generally perpendicular to the length of the flexible member.

16. The marking tool of claim 13, wherein:

the pivot connection between the flexible member and the holder is biased toward a predetermined orientation.

17. The marking tool of claim 13, wherein:

the marking tool is mounted on the fiber placement machine with the tip being at a known position relative to the fiber placement machine so that the marking tool can be controlled by an NC program that controls the fiber placement machine.

18. The marking tool of claim 17, wherein:

the flexible member allows the marking member to vibrate in response to the tip marking the work piece.

19. The marking tool of claim 13, wherein:

a centerline of the tip is in-line with a laser attached to the fiber placement machine;

the tip is offset a known distance from the laser; and control of the marking tool is programmed into the fiber placement machine using an NC program written to control the laser that is modified to account for the known offset between the tip and the laser.

* * * * *